(12) United States Patent
Nakagawa

(10) Patent No.: US 8,149,073 B2
(45) Date of Patent: Apr. 3, 2012

(54) BAND-PASS FILTER AND METHOD FOR MAKING PHOTONIC CRYSTAL FOR THE BAND-PASS FILTER

(75) Inventor: Takuji Nakagawa, Muko (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 655 days.

(21) Appl. No.: 12/183,621

(22) Filed: Jul. 31, 2008

(65) Prior Publication Data

US 2009/0034900 A1 Feb. 5, 2009

(30) Foreign Application Priority Data

Aug. 3, 2007 (JP) ................................. 2007-202585
Jun. 5, 2008 (JP) ................................. 2008-147775

(51) Int. Cl.
*H01P 1/207* (2006.01)
*H01P 7/00* (2006.01)

(52) U.S. Cl. ....................... 333/209; 333/219.2; 333/235

(58) Field of Classification Search .......... 333/202–205, 333/208–212, 219, 227, 228, 231, 235, 219.2; 430/311
See application file for complete search history.

(56) References Cited

U.S. PATENT DOCUMENTS

| | | | |
|---|---|---|---|
| 5,184,097 A * | 2/1993 | Brouzes et al. | 333/202 |
| 6,563,398 B1 * | 5/2003 | Wu | 333/137 |
| 6,998,942 B2 * | 2/2006 | Kirihara et al. | 333/239 |

FOREIGN PATENT DOCUMENTS

| | | |
|---|---|---|
| JP | 2002-090525 | 3/2002 |
| JP | 2004-085851 | 3/2004 |
| JP | 2006-270012 | 10/2006 |

OTHER PUBLICATIONS

Baryshev et al, "Optical spectroscopy of the photonic bandgap in opals", Jun. 23-28, 2003, IOFFE Institute.*
Jie Xu, Rui-Xin Wu, Ping Chen and Yue Shi. "Transmission characteristics of two-dimensional magnetized magnetic photonic crystals." J. Phys. D: Appl. Phys. 40 (2007) 960-963. IOP Publishing Ltd. UK.
Xiaoying Zhao and Lezhu Zhou. "Analysis of the reflected and transmitted properties of Ferrite EBG." http://www.paper.edu.cn, Department of Electronics Engineering Peking University, Beijing, China. Apr. 5, 2005.
Mitsuteru Inoue. *Expected Materials for the Future* vol. 2 No. 10. p. 14-18. Oct. 10, 2002.

* cited by examiner

*Primary Examiner* — Benny Lee
*Assistant Examiner* — Gerald Stevens
(74) *Attorney, Agent, or Firm* — Dickstein Shapiro LLP

(57) ABSTRACT

A band-pass filter includes a photonic crystal having a local mode that generates a pass band in a stop band formed by Bragg reflection, a transmission channel that limits electromagnetic waves propagating in the photonic crystal to a mode in which an amplitude direction of an electrical field is a particular direction; and a magnetic field-applying unit for applying to the photonic crystal a DC magnetic field in a direction perpendicular to a propagation direction of the electromagnetic waves. The photonic crystal includes a periodic structure including a low permittivity dielectric member and a plurality of high permittivity dielectric members periodically arranged in the low permittivity dielectric member so that the Bragg reflection occurs in the periodic structure, and a magnetic member disposed in the periodic structure.

17 Claims, 15 Drawing Sheets

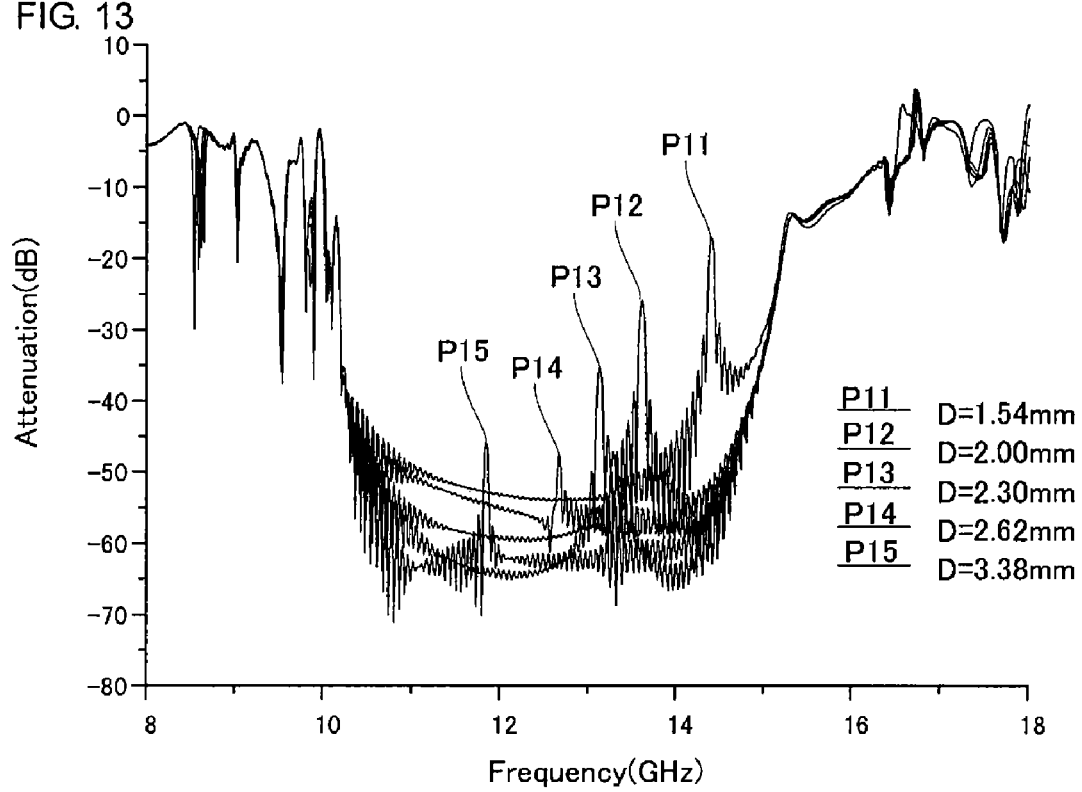

BAND-PASS FILTER AND METHOD FOR MAKING PHOTONIC CRYSTAL FOR THE BAND-PASS FILTER

BACKGROUND OF THE INVENTION

1. Field of the Invention

The present invention relates to a frequency-variable band-pass filter and a method for making a photonic crystal used in the band-pass filter.

2. Description of the Related Art

A band-pass filter incorporating a one-dimensional magnetic photonic crystal as a magnetooptic member has been available in the related art. For example, Japanese Unexamined Patent Application Publication No. 2002-90525 ("'525 document" hereinafter) describes a one-dimensional magnetic photonic that includes two dielectric multilayer films in which the dielectric materials are alternately laminated with each thickness thereof being regular and an irregular layer (defective layer) composed of a magnetic material.

The structure of the one-dimensional magnetic photonic crystal described in '525 document is shown in FIG. 1.

As shown in FIG. 1, a magneto-optic member 10 is constituted by the one-dimensional magnetic photonic crystal and includes two periodic dielectric multilayer films 13 and 14 in each of which two kinds of dielectric substances (dielectric thin films) 11 and 12 of uniform thickness are alternately laminated and a magneto-optical thin film (magnetic substance) 15 which is provided between the two 1

The periodic dielectric multilayer films 13 and 14 serve as reflecting mirrors of a Fabry-Perot resonator, and the thickness of each of the dielectric substances (dielectric thin films) 11 and 12 is designed so that the optical length (product of actual film thickness and refractive index) is equal to $\lambda/4$ (where $\lambda$ is the wavelength of light). The optical length of the irregular layer (defective layer) constituted by the magnetic substance (magneto-optic thin film 15) in which localization of light occurs is set equal to $m\lambda/2$ (m is a positive integer).

However, an optical isolator including the magneto-optic member described in '525 document has a frequency characteristic determined by the thicknesses of the two dielectric substances. Accordingly, the pass band will be fixed if the optical isolator is configured to serve as a band-pass filter. Thus, this technology has not been applied to band-pass filters of communication devices such as multiband transmitters and the like.

SUMMARY OF THE INVENTION

An object of the present invention is to provide a band-pass filter with a variable pass band and a method for making a photonic crystal for use in such a band-pass filter.

A first aspect of the present invention provides a band-pass filter that includes a photonic crystal having a local mode that generates a pass band in a stop band formed by Bragg reflection, the photonic crystal including a periodic structure including a low permittivity dielectric member and a plurality of high permittivity dielectric members periodically arranged in the low permittivity dielectric member so that the Bragg reflection occurs in the periodic structure, and a magnetic member disposed in the periodic structure; a transmission channel that limits electromagnetic waves propagating in the photonic crystal to a mode in which the amplitude direction of an electrical field is a particular direction; and magnetic field-applying unit for applying a DC magnetic field to the photonic crystal in a direction perpendicular to a propagation direction of the electromagnetic waves.

In the first aspect of the present invention, the periodic structure electromagnetically functions as a band stop filter. The magnetic member disposed in the periodic structure generates a local mode that generates a pass band in the stop band region and thereby generates a pass band in the stop band from the electromagnetic viewpoint. Consequently, the mode propagating in the transmission channel is limited to a mode (particular propagation mode) in which the amplitude direction of the electrical field is in a particular direction. As a DC magnetic field is applied to the ferrite resonance layer in a direction perpendicular to the propagating direction of the electromagnetic waves, the components of the permeability that affect the particular propagation mode in the magnetic member change, and thus the resonance frequency of the local mode, i.e., the frequency of the pass band, is shifted. Thus, the band-pass filter can be used in multiband transmitters, for example.

Preferably, the electrical length inside the magnetic member is about ½ wavelength at a frequency within the pass band. In this manner, a strong local mode can be generated and the passing loss of the pass band can be reduced.

The direction of the DC magnetic field is preferably substantially parallel to the amplitude direction of the electrical field. In this manner, the effect of the DC magnetic field on the permeability is maximized, and high-efficiency control is enabled.

The magnetic field-applying unit may control an intensity of the DC magnetic field to be equal to or lower than a magnetic field at which the magnetic member magnetically resonates and in the range of effective relative permeability of 1 or less. As a result, a low insertion loss characteristic in the pass band can be achieved.

Preferably, the intensity of the DC magnetic field applied from the magnetic field-applying unit is variable. In this manner, the frequency of the pass band can be set at a particular value or can be made freely adjustable within the frequency range. Accordingly, the band pass filter can be used in frequency-variable multiband transmitters.

The transmission channel is preferably a rectangular waveguide since the electromagnetic waves propagating in the transmission channel can be easily limited to a mode (TE mode) in which the amplitude direction of the electrical field is a particular direction.

The magnetic member is preferably composed of a ferrite since a change in frequency in the pass band relative to the change in DC magnetic field applied from outside can be magnified.

The low permittivity dielectric member may include low permittivity dielectric layers, the high permittivity dielectric member includes high permittivity dielectric layers, and the magnetic member includes a magnetic plate. The photonic crystal may include two reflectors in which the low permittivity dielectric layers and the high permittivity dielectric layers are alternately stacked, and the magnetic plate disposed between the two reflectors. The photonic crystal may be a Fabry-Perot resonator that includes a resonance layer for generating a pass band in a stop band formed by the two reflectors. With this structure, the band pass filter electromagnetically functions as a band stop filter. The resonance layer constituted by the magnetic member disposed between the two reflectors functions as a defective layer in the one-dimensional photonic crystal, thereby generating resonance in the local mode and electromagnetically generating a pass band in the stop band. As the mode propagating in the transmission channel is limited to a particular propagation mode in which the amplitude direction of the electrical field is a particular direction and a DC magnetic field is applied to the resonance layer in a direction perpendicular to the propagating direction of the electromagnetic waves, the components of the permeability that affect the particular propagation mode in the resonance layer change, and thus the resonance frequency of the local mode, i.e., the frequency of the pass band, is shifted.

The resonance layer will function as a resonance layer of a Fabry-Perot resonator when the optical path length of the resonance layer is an integral multiple of ½ wavelength. The optical length of the resonance layer is represented by n·λ/2, where λ is the wavelength of the pass band and n is an integer. Although the resonance layer functions properly with n of 2 or more, the resonance layer is thinnest and the permeability is highest when n is 1, i.e., when the optical path length of the resonance layer is ½ wavelength. Thus, the passing loss of the pass band can be reduced.

The optical length of each of the low permittivity dielectric layers and the high permittivity dielectric layers is preferably about ¼ wavelength at the wavelength of the stop band. In this manner, Fabry-Perot interference occurs and the thickness of each layer can be minimized. Thus, the insertion loss in the pass band can be decreased.

The low permittivity dielectric layers are preferably composed of a resin and outermost layers of the photonic crystal are preferably resin layers since these layers can be easily made by stereolithography.

The high permittivity dielectric members may be cylindrical dielectric rods; the low permittivity dielectric member may be shaped to occupy space around the cylindrical dielectric rods; the magnetic member may be a cylindrical magnetic rod; and the photonic crystal may have the dielectric rods arranged in a two-dimensional pattern inside the low permittivity dielectric member and a particular position in the pattern is occupied by the magnetic rod. With this structure, a two-dimensional photonic crystal having a relatively simple structure can be made.

A second aspect of the present invention provides a method for making the above-described photonic crystal for a band-pass filter. The method includes the steps of forming the low permittivity dielectric member with a photo-curable resin and forming regions in which the high permittivity dielectric members are to be arranged by stereolithography involving scanning a photo-curable resin with light; and inserting the high permittivity dielectric members and the magnetic member in the regions. These steps are performed sequentially in that order.

According to the second aspect of the present invention, the low permittivity dielectric member and the high permittivity dielectric members can be easily formed. Moreover, the photonic crystal for the band pass filter can be easily made by inserting the low permittivity dielectric member and the high permittivity dielectric members in these regions.

Other features, elements, characteristics and advantages of the present invention will become more apparent from the following detailed description of preferred embodiments of the present invention with reference to the attached drawings.

BRIEF DESCRIPTION OF THE DRAWINGS

FIG. 13 is a graph showing the change in local frequency when the diameter of the magnetic rod is changed;

DESCRIPTION OF THE PREFERRED EMBODIMENTS

First Embodiment

A band-pass filter and a method for making a Fabry-Perot resonator according to a first embodiment of the present invention will now be described with reference to FIGS. 2A to 8.

Figure 1:
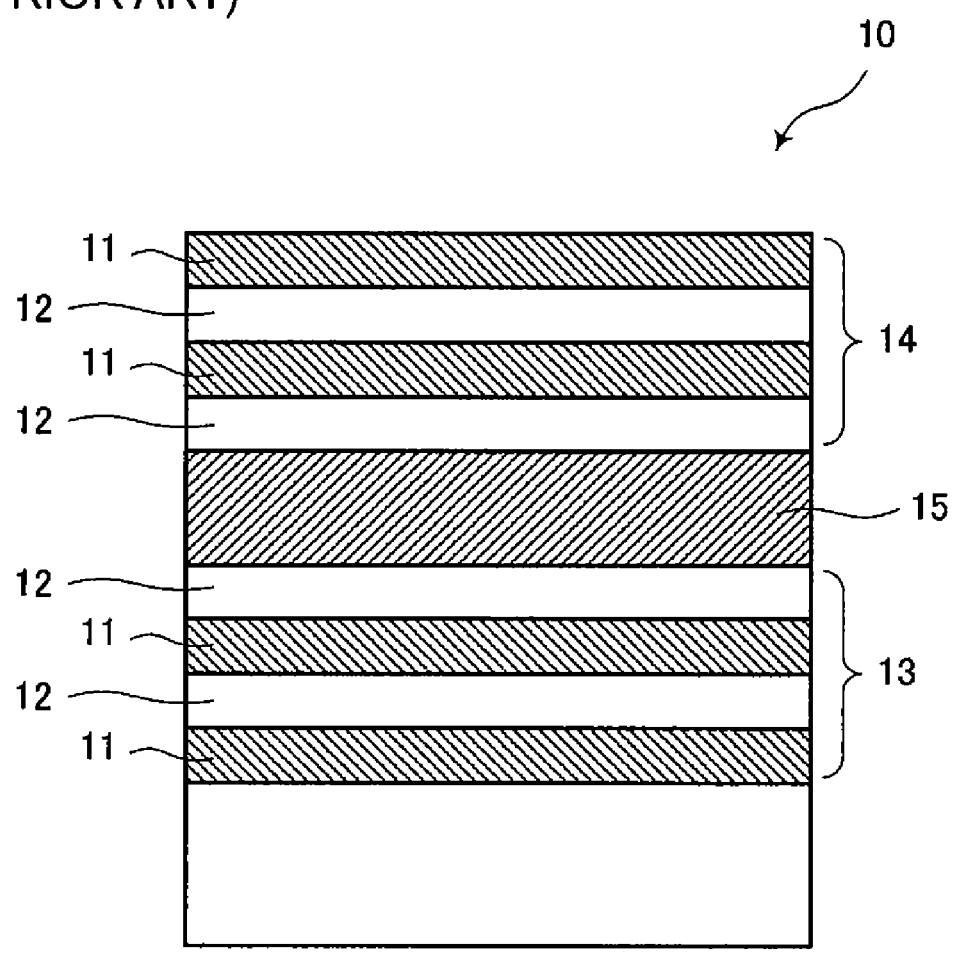
FIG. 1 is a diagram showing an optical isolator described in Japanese Unexamined Patent Application Publication No. 2002-90525.
Figure 2A:
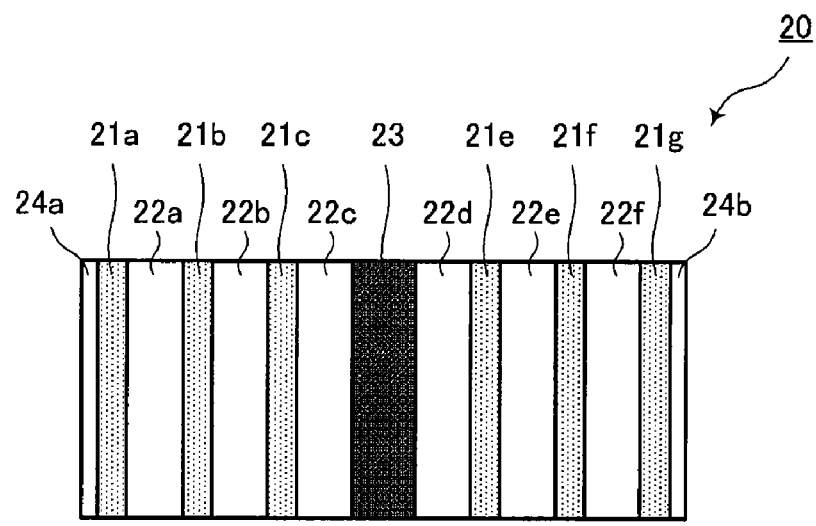
FIG. 2A is a diagram showing a Fabry-Perot resonator used in a band-pass filter of a first embodiment and FIG. 2B is a diagram showing a comparative example of a Fabry-Perot resonator of a first embodiment.
Figure 2B:
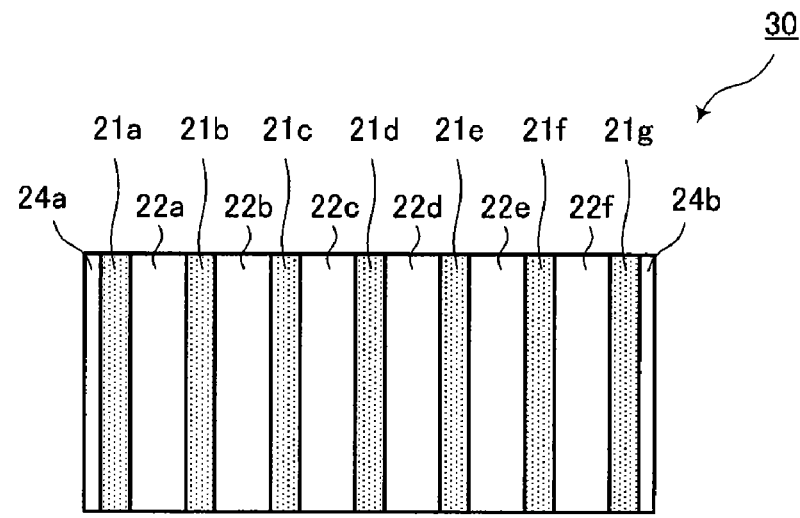

FIG. 2A is a cross-sectional view of a Fabry-Perot resonator 20 including a photonic crystal for use in a band-pass filter of the first embodiment. FIG. 2B is a cross-sectional view of a Fabry-Perot resonator 30 as a comparative example.

Referring to FIG. 2A, the Fabry-Perot resonator 20 includes alumina plates 21a, 21b, 21c, 21e, 21f, and 21g respectively forming dielectric layers having high permittivities (hereinafter referred to as "high-k dielectric layers"); epoxy resin layers 22a, 22b, 22c, 22d, 22e, 22f, 24a, and 24b, respectively forming dielectric layers having low permittivities (hereinafter referred to as "low-k dielectric layers"); and a ferrite plate 23 functioning as a resonance layer.

As used herein, the high permittivity is at least about double of the low permittivity.

The thickness of each alumina plate 21 and the thickness of each epoxy resin layer 22 are adjusted to be substantially equal to ¼ wavelength in the pass band (variable range of the pass band) of a band-pass filter incorporating the Fabry-Perot resonator 20. The thickness of the ferrite plate 23 is set to be substantially equal to ½ wavelength at the center frequency of the pass band.

Examples will now be described with reference to specific figures.

Suppose the center frequency of the band gap of the Fabry-Perot resonator 20 is 12.5 GHz. The optical path length (1 wavelength) at 12.5 GHz in vacuo is 24 mm, the ½ wavelength is 12 mm, and the ¼ wavelength is 6 mm. Since the relative permittivity of the epoxy resin layer 22 is 2.8, the thickness of the epoxy resin layer 22 is set to be 6 mm/$\sqrt{2.8}$=3.6 mm (¼ wavelength). Since the relative permittivity of the alumina plate 21 is 8.4, the thickness of the alumina plate 21 is set to be 6 mm/$\sqrt{8.4}$=2.1 mm (¼ wavelength). In this embodiment, three alumina plates each 0.7 mm in thickness are laminated to achieve such a thickness.

Since the ferrite plate 23 has a relative permittivity $\epsilon r$ of 11.8 and an effective relative permeability $\mu eff$ (zero magnetic field) of 0.76, the effective relative permittivity is $\epsilon r \cdot \mu eff$=11.8×0.76=8.97. Thus, the thickness of the ferrite plate 23 is set to 12 mm/$\sqrt{8.97}$=4.0 mm (½ wavelength). In this embodiment, two ferrite plates each 2.0 mm in thickness are laminated to achieve this thickness.

The relative permittivities and the effective relative permeabilities of the epoxy resin, alumina plates, and ferrite plates are measured by an S-parameter method (Nicolson-Ross method). The effective relative permeability of the ferrite plate in a zero magnetic field is less than 1 probably because of the effect of residual magnetization.

The outermost layers of the Fabry-Perot resonator 20 shown in FIG. 2A are the epoxy resin layers 24a and 24b, which are low-k dielectric layers. The thickness of the epoxy resin layers 24a and 24b, is set to be smaller than that of the epoxy resin layer 22.

The outermost layers are designed as follows. Generally, the outermost layers are preferably epoxy layers rather than alumina layers. This is because the epoxy resin has a refractive index close to that of air and causes smaller loss by reflection. As a general rule, both the thickness of epoxy layers, which are low-k dielectric layers, and that of alumina layers, which are high-k dielectric layers, should be the ¼ wavelength. Although the band gap deepens as the number of epoxy layers and alumina layers laminated increases, the permeability also decreases. In other words, from the permeability viewpoint, the number and thickness of layers laminated are preferably as small as possible. If the Fabry-Perot resonator 20 is formed by stereolithography described below, the outermost layers are preferably epoxy layers rather than alumina layers to simplify the fabrication and to save costs. Due to these factors, the outermost layers are designed as epoxy resin layers having a thickness of 1 mm which is smaller than the ¼ wavelength.

FIG. 2B shows the Fabry-Perot resonator 30 with no ferrite plate 23 shown in FIG. 2A functioning as the resonance layer. The Fabry-Perot resonator 30 is a periodic structure in which the epoxy resin layers 22a to 22f and alumina plates 21a to 21g, each a plate of ¼ wavelength in thickness, are simply alternately laminated. In other words, the Fabry-Perot resonator 20 is the Fabry-Perot resonator 30 with the alumina plate 21d, i.e., the high-k dielectric layer at the middle in the structure shown in FIG. 2B, replaced with the ferrite plate 23 having an optical path length of ½ wavelength. The ferrite plate 23 functions as a defective layer in the photonic crystal in which local-mode resonance occurs. The characteristics thereof will be described below.

Figure 3A:
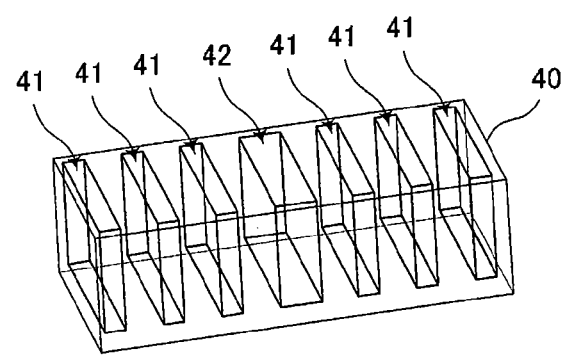
FIGS. 3A to 3D show a method for making the Fabry-Perot resonator.

FIGS. 3A to 3D show a method for making the Fabry-Perot resonator 20 shown in FIG. 2A. Referring to FIG. 3A, a rectangular parallel piped structure having a plurality of slits (cavities) 41 and 42 is formed with a stereolithography system (e.g., SCS-300P produced by D-MEC Ltd.) by using a UV-curable epoxy resin (SCR-730) as a material.

Figure 3B:
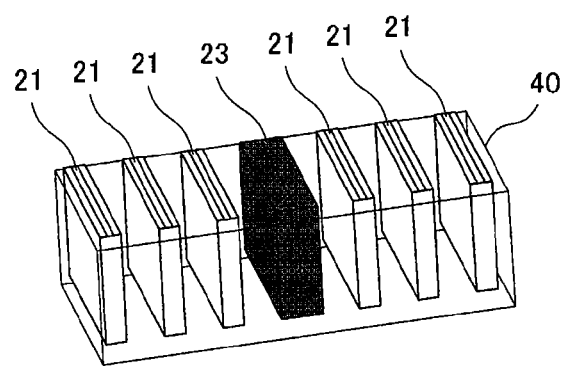

Then as shown in FIG. 3B, alumina plates 21 are inserted in the slits 41 and a ferrite plate 23 is inserted in the slit 42. The thicknesses of the slits 41 and 42 are set in advance to correspond to the thicknesses of the alumina plates 21 and the ferrite plate 23.

Figure 3C:
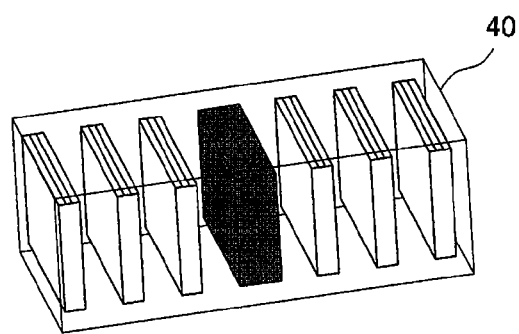

Next, as shown in FIG. 3C, an epoxy resin 40 is formed at the top so that the gaps in the slits 41 and 42 and the top of the alumina plates 21 and the ferrite plate 23 are sealed with the resin.

Figure 3D:
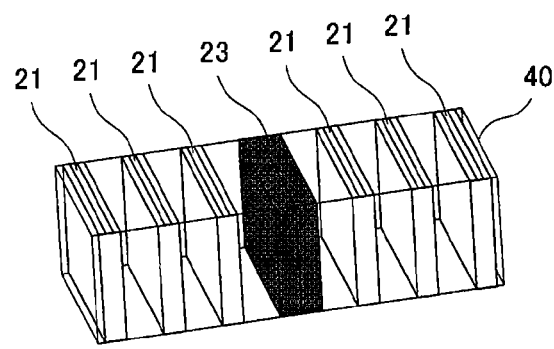

Next, as shown in FIG. 3D, unnecessary portions of the resin around the edges of the alumina plates 21 and the ferrite plate 23 are removed by cutting. As a result, the alumina plates 21 and the ferrite plate 23 are exposed in four side surfaces of the composite constituted by the alumina plates 21, the ferrite plate 23, and the epoxy resin 40.

An epoxy resin-ceramic composite serving as the periodic structure shown of the comparative example shown in FIG. 2B is also made by stereolithography in the same manner except for the ferrite plate 23 inserted in the center.

Referring to FIG. 3D, parts of the epoxy resin 40 that exist between the alumina plates 21, between the alumina plates 21 and the ferrite plate 23, and in the outermost layers form the epoxy resin layers 22a to 22f, 24a, and 24b, shown in FIG. 2A.

The size, composition, and characteristics of each component are as follows:
(a) Alumina plates
  Alumina purity: 96%
  Size: 19.0×9.5×0.7 mm
  Relative permittivity: 8.4 at 12 GHz
(b) Ferrite plate
  Composition: NiCuZn-based ferrite
  $Fe_2O_3$: 47 mol %, NiO: 20.5%, ZnO: 22%, CuO: 10.5%
  Size: 19.0×9.5×2.0 mm
  Relative permittivity: 11.8
  Effective relative permeability: 0.76 at 12 GHz
  Effective relative permittivity: 8.97 at 12 GHz
(c) Epoxy resin
  Relative permittivity: 2.8
  Instead of the ferrite described above, a spinel ferrite (Mg—Mn ferrite, Mg—Mn—Al ferrite, Ni—Zn ferrite, Ni—Al ferrite, or Li—Fe ferrite), or a garnet ferrite (Y—Fe ferrite or Gd—Fe ferrite) may also be used.

Figure 4:
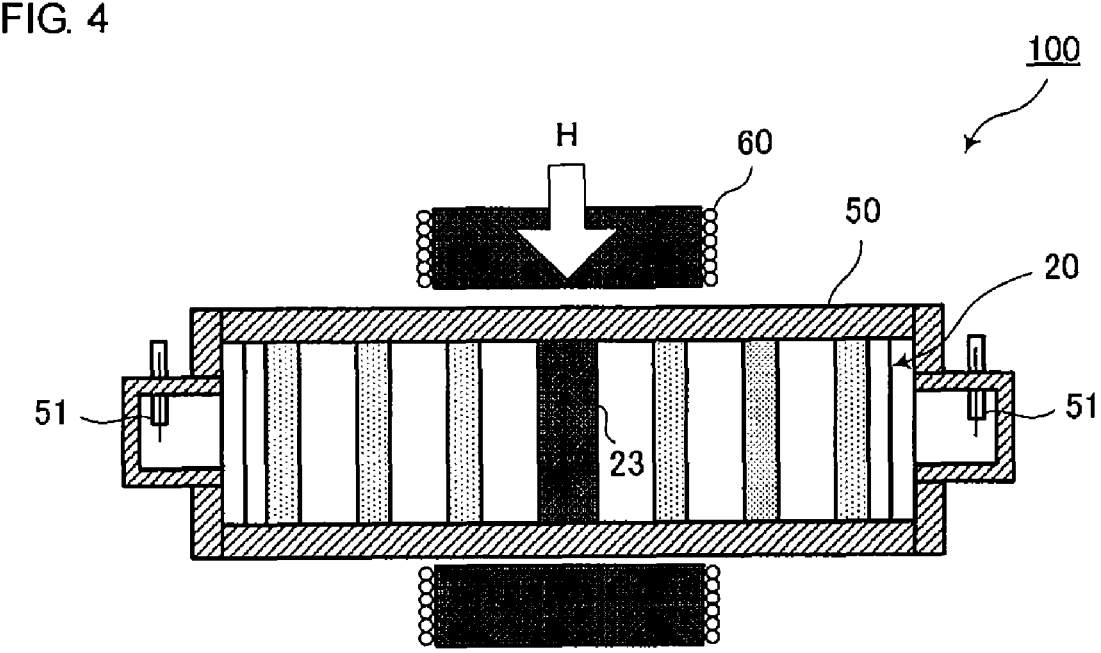
FIG. 4 is a cross-sectional view showing the structure of the band-pass filter of a first embodiment.

FIG. 4 is a cross-sectional view showing the overall structure of a band-pass filter 100 including the Fabry-Perot resonator 20 shown in FIG. 2A and FIG. 3A to 3D. Referring to FIG. 4, the band-pass filter 100 includes a rectangular waveguide 50 which propagates only the transverse electric (TE) mode in which the amplitude direction of the electrical field of the propagating electromagnetic waves is the vertical direction. That is, the amplitude direction of the electrical field is the vertical direction in FIG. 4 and the amplitude direction of the magnetic field is a direction perpendicular to the plane of paper of FIG. 4.

The rectangular waveguide 50 functions as a transmission channel that limits the electromagnetic waves propagating in the Fabry-Perot resonator 20 to a mode in which the amplitude direction of the electrical field is a particular direction.

In order to adjust the center frequency of the pass band to 12.5 GHz, the width of the rectangular waveguide 50 is set to 19.05 mm and the height to 9.525 mm.

The rectangular waveguide 50 is composed of Al, Cu, or a resin plated with Cu, Ag, or the like.

The Fabry-Perot resonator 20 shown in FIG. 2A is inserted (loaded) in the rectangular waveguide 50. Each end of the rectangular waveguide 50 is provided with a probe 51 for signal input/output so that signals can be input and output through coaxial connectors.

An electromagnet 60 for applying a DC magnetic field H from outside the rectangular waveguide 50 to the ferrite plate 23 of the Fabry-Perot resonator 20 is also provided. The DC magnetic field H is applied in the amplitude direction of the electrical field of the electromagnetic waves propagating in the rectangular waveguide 50, i.e., in the direction penetrating the electrical field planes of the rectangular waveguide 50.

Since the DC magnetic field H is applied from outside the rectangular waveguide 50, a magnetic shielding material such as Fe or the like is rarely used in the rectangular waveguide 50.

The mode propagating in the rectangular waveguide 50 is limited to the mode in which the amplitude direction of the electrical field is a particular direction (propagation mode). As a DC magnetic field is applied to the ferrite resonance layer in a direction perpendicular to the propagating direction of the electromagnetic waves, the components of the permeability that affect the particular propagation mode in the resonance layer change, and thus the resonance frequency of the local mode, i.e., the frequency of the pass band, is shifted.

The characteristics of the band-pass filter shown in FIG. 4 will now be described with reference to FIGS. 5A to 7.

Figure 5A:
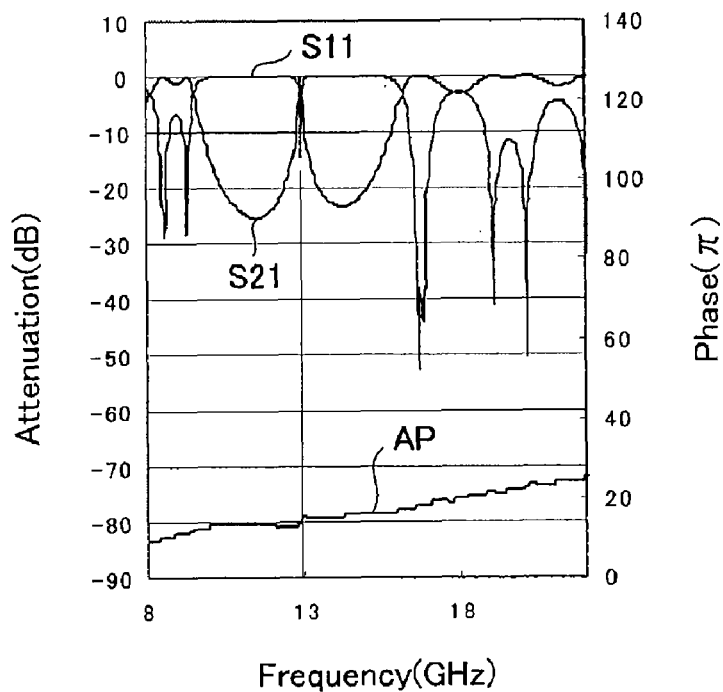
FIGS. 5A and 5B are graphs showing simulation results of the transmission characteristic and reflection characteristic of the band-pass filters of a first embodiment.
Figure 5B:
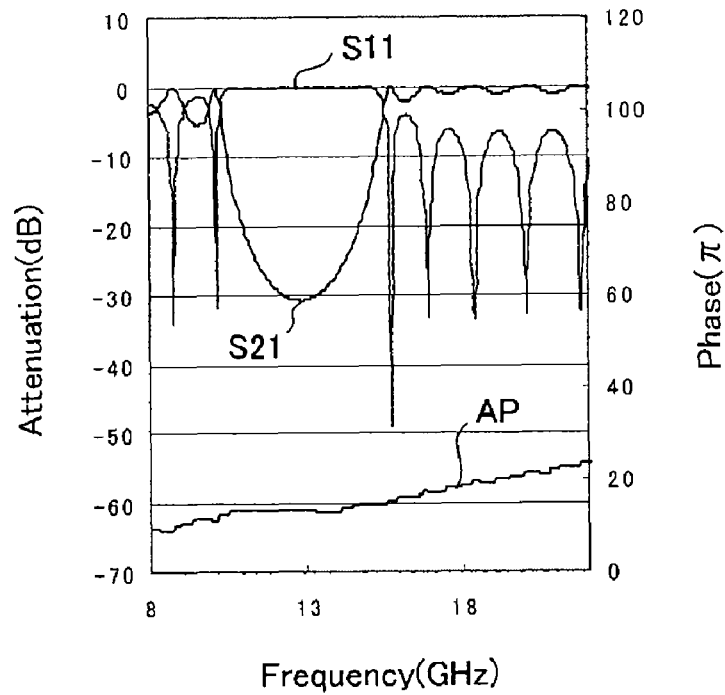

FIG. 5A is a characteristic diagram based on simulation results of the band-pass filter 100 shown in FIG. 4. FIG. 5B is a characteristic diagram based on simulation results of a comparative band-pass filter in which the Fabry-Perot resonator 30 of the comparative example is loaded inside the rectangular waveguide 50 having a structure shown in FIG. 4. The simulation employed here is based on the transmission line theory.

In the graph of FIGS. 5A and 5B, S21 indicates the transmission characteristic, S11 indicates the reflective characteristic, and AP indicates the adding phase. As shown in FIG. 5B, if no ferrite plate 23 is provided as a defective layer, a band gap in which the characteristic 21 drops in the band ranging from about 10.5 to about 15.5 GHz is generated in the photonic crystal. In contrast, in the case where the Fabry-Perot resonator 20 with the ferrite plate 23 is inserted, the local mode resonance by the ferrite plate 23 occurs at 12.5 GHz, and the characteristic S21 becomes substantially zero (zero attenuation) at this frequency, as shown in FIG. 5A.

Figure 6A:
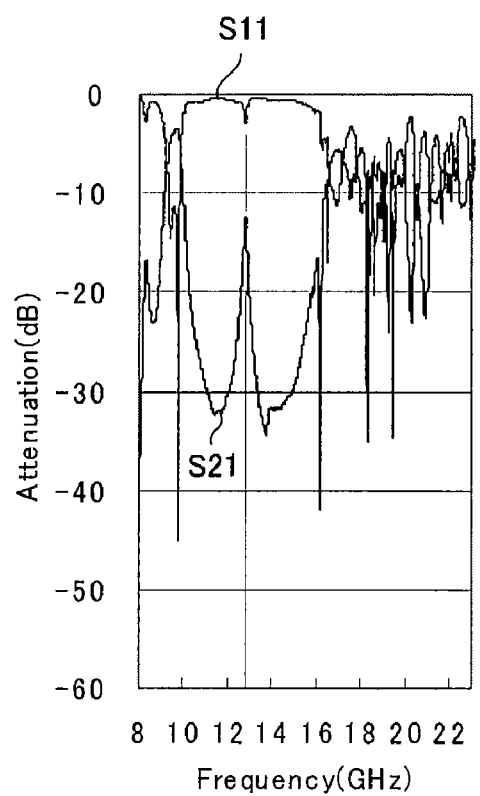
FIGS. 6A and 6B are graphs showing actual results of the transmission characteristic and reflection characteristic of the band-pass filters of a first embodiment.
Figure 6B:
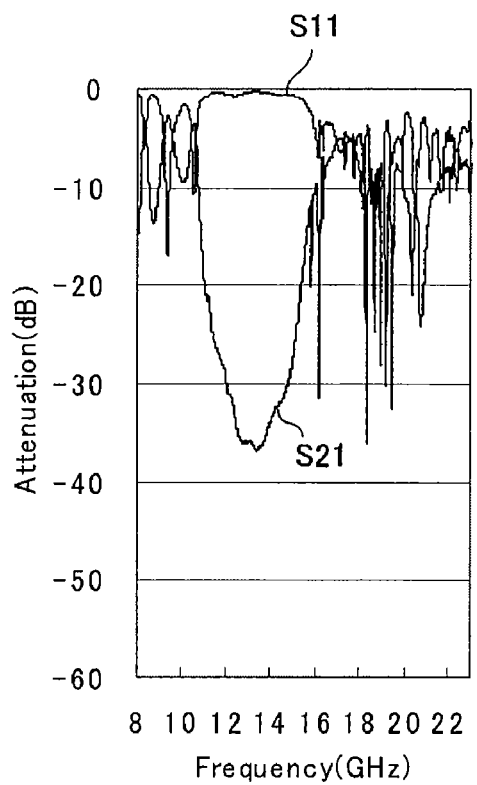

FIG. 6A shows actual measurement results of the band-pass filter 100 shown in FIG. 4. FIG. 6B shows actual measurement results of the comparative filter having the same structure as that shown in FIG. 4 but with the Fabry-Perot resonator 30 of the comparative example loaded inside the rectangular waveguide 50. FIGS. 6A and 6B show that the actual measurement results are substantially similar to the simulation results shown in FIGS. 5A and 5B.

Because of the periodic structure including low-k dielectric members and high-k dielectric members, Bragg reflection occurs at a particular frequency and the structure operates as a Fabry-Perot resonator. Meanwhile, local-mode resonance occurs with the ferrite plate 23, and a band pass characteristic is obtained.

Figure 7:
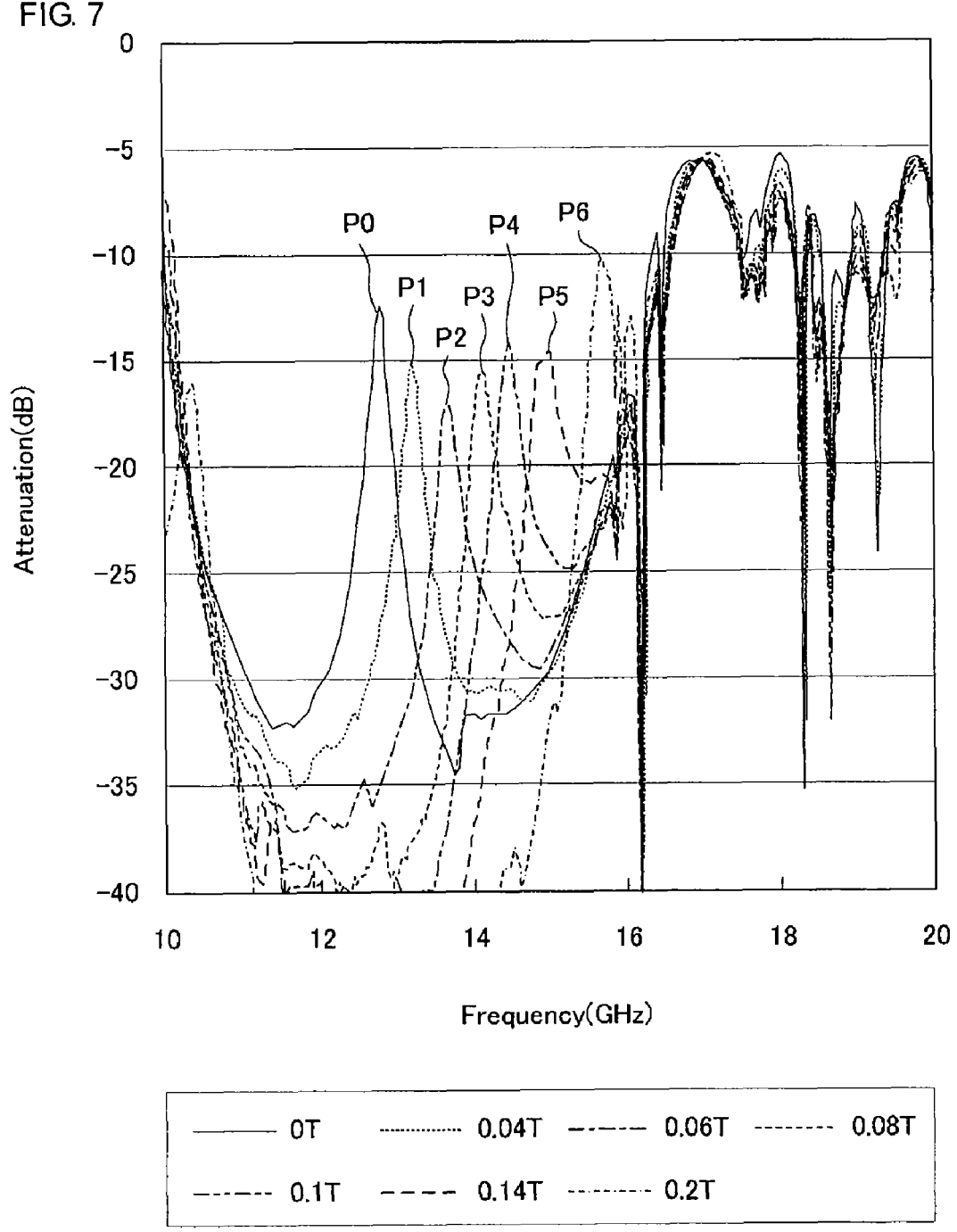
FIG. 7 is a graph showing an example of frequency changes in a pass band relative to changes in magnetic field applied to a ferrite plate.

FIG. 7 is a graph showing changes in band-pass filter characteristic of the band-pass filter shown in FIG. 4 observed when magnetic fields of various intensities are applied to the ferrite plate 23 from the electromagnet 60. P0 to P6 all indicate S21 characteristics. The magnetic flux density of the core of the electromagnet 60 is as follows:

P0: 0 T
P1: 0.04 T
P2: 0.06 T
P3: 0.08 T
P4: 0.10 T
P5: 0.14 T
P6: 0.20 T

The intensity of the magnetic field applied to the ferrite plate 23 is proportional to the magnetic flux density of the core of the electromagnet 60, and the relative permeability $\mu r$ of the ferrite plate 23 decreases with an increase in applied magnetic field. Thus, the resonance frequency of the local mode increases, and this causes the pass band to shift upward.

Figure 8:
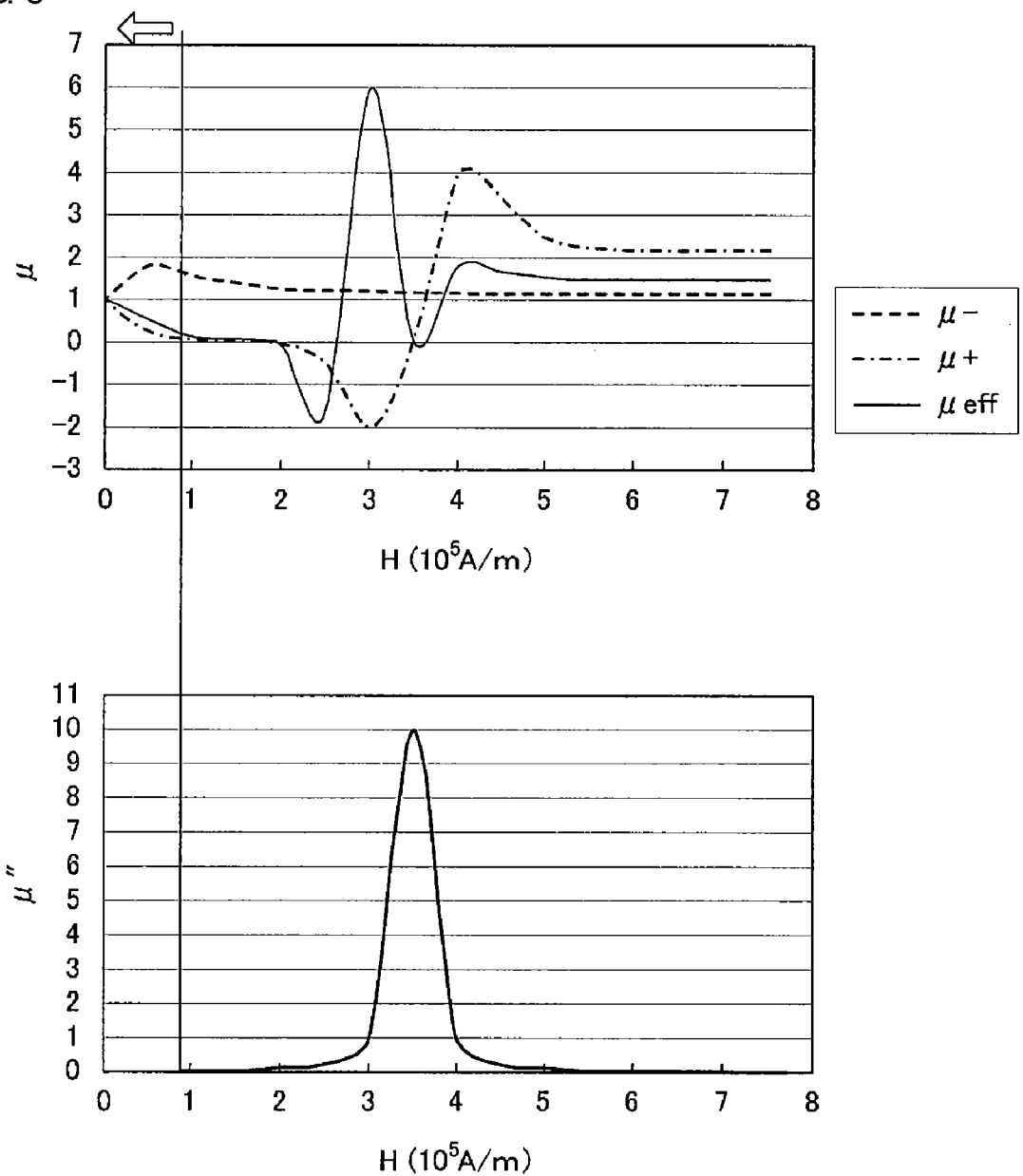
FIG. 8 includes graphs showing the relationship between the permeability of the ferrite plate and the applied magnetic field and the relationship between the loss of the ferrite plate and the applied magnetic field.

The upper part of FIG. 8 shows the relationship between the permeability of the ferrite plate and the applied magnetic field. The lower part of FIG. 8 shows the relationship between the loss in the ferrite plate and the applied magnetic field. Here, $\mu+$ is a positive circularly polarized relative permeability, $\mu-$ is a negative circularly polarized relative permeability, and $\mu eff$ is an effective relative permeability.

In this embodiment, a rectangular waveguide that propagates the TE mode is used. Thus, only the transmission state of the TE mode needs to be considered, and the effective relative permeability of the defective layer is represented by the following equation:

$$\mu\mathit{eff} = 2\{(1/\mu+) + (1/\mu-)\}^{-1}$$

The local mode appears in the ferrite plate when the optical path length is ½ wavelength. The optical path length is proportional to $1/\sqrt{(\epsilon \times \mu)}$. Although the permittivity of the ferrite does not change with the magnetic field, the permeability changes according to the above-described equation.

As shown in FIG. 8, the effective relative permeability linearly changes within the range of 1 to 0 with changes in magnetic field at an applied magnetic field H of $1 \times 10^5$ A/m or less.

As a result, the effective relative permeability can be changed with the applied magnetic field, and the pass wavelength can be controlled as shown in FIG. 7. Since the Fabry-Perot resonator has a periodic structure, the change in pass wavelength with the applied magnetic field can be made more explicit.

Note that the values of the effective relative permeability shown in FIG. 8 do not take into account residual magnetization. In an actual ferrite plate, the effective relative permeability is sometimes less than 1 due to the residual magnetization even when no magnetic field is applied from outside. In such a case also, the working principle of the band-pass filter of this embodiment remains the same.

In the range of $1 \times 10^5$ A/m, as shown by the $\mu''$ characteristic of FIG. 8, the magnetic field is significantly smaller than the magnetic resonance frequency, and thus the loss caused by magnetic resonance is small. Thus, a low insertion loss characteristic can be achieved in the pass band.

Theoretically, the permeability components that affect the particular propagation mode (the mode in which the amplitude direction of the electrical field is a particular direction) in the ferrite resonance layer should remain unchanged and the frequency of the local mode should remain the same even when a magnetic field is applied in a direction perpendicular to the magnetic field plane (the direction perpendicular to the plane of paper) of the rectangular waveguide shown in FIG. 4. However, actual experiments reveal that the pass band slightly shifts toward the lower-frequency side as the intensity of the magnetic field increases. However, the amount of shift is negligible and thus the shift is not particularly taken into consideration in the structure shown in FIG. 4.

Second Embodiment

A band-pass filter and a method for making a photonic crystal according to a second embodiment of the present invention will now be described with reference to FIGS. 9A to 14B.

FIGS. 9A to 9D are diagrams showing the structure of a photonic crystal 70 for use in the band-pass filter of the second embodiment.

Figure 9A:
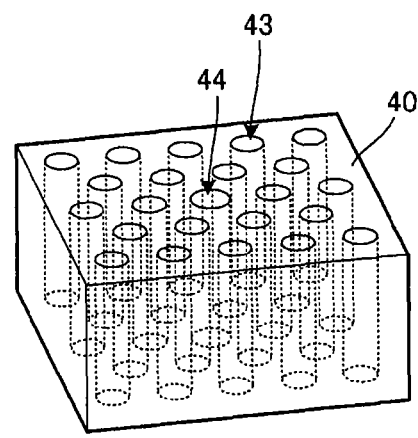
FIGS. 9A to 9D show a structure of a photonic crystal 70 incorporated in a band-pass filter of a second embodiment.
Figure 9B:
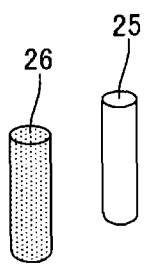

FIG. 9A is a perspective view of an epoxy resin 40, i.e., a low-k dielectric member; FIG. 9B is a diagram showing the shapes of a cylindrical dielectric rod 25, which is a high-k dielectric member, and a cylindrical magnetic rod 26, which is a magnetic member. Holes 43 in which the dielectric rods 25 are to be inserted are arranged in a particular two-dimensional pattern in the epoxy resin 40, and a hole 44 in which the magnetic rod 26 is to be inserted is provided at the center of the pattern.

The dielectric rod 25 is composed of a $(Zr,Sn)TiO_4$ based ceramic, and the magnetic rod 26 is composed of a NiCuZn-based ferrite.

Figure 9C:
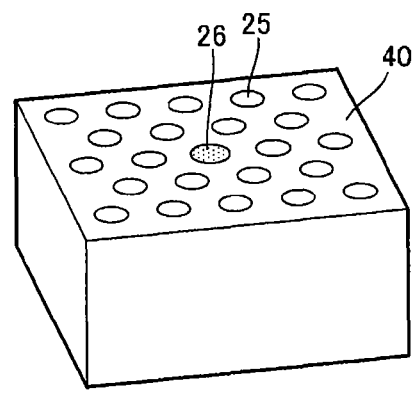

FIG. 9C shows the state in which the dielectric rods 25 are inserted in the holes 43 and the magnetic rod 26 is inserted in the hole 44 shown in FIG. 9A. Then, as shown in FIG. 9D, a layer of the epoxy resin 40 is formed on the top of the dielectric rods 25 and the magnetic rod 26 to form a photonic crystal 70 having the magnetic rod 26 and the dielectric rods 25 embedded in the epoxy resin 40.

Figure 9D:
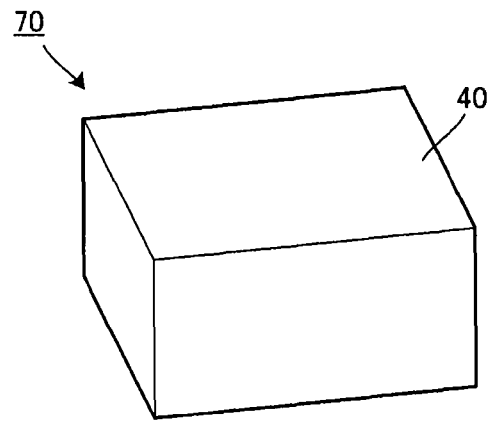

The photonic crystal 70 shown in FIG. 9D is made as follows. First, a rectangular parallel piped structure having a plurality of holes 43 and 44 shown in FIG. 9A is formed with a stereolithography system by using a UV curable epoxy resin. The stereolithography system and the UV curable epoxy resin used here are the same as those of the first embodiment.

The inner diameters of the holes 43 and 44 are adjusted to correspond to the outer diameters of the dielectric rods 25 and the magnetic rod 26.

After the dielectric rods 25 and the magnetic rod 26 are inserted in the holes, the epoxy resin 40 is formed on the top as shown in FIG. 9C so that the gaps around the dielectric rods 25 and the magnetic rod 26 and the top of the dielectric rods 25 and the magnetic rod 26 are sealed with the epoxy resin.

As a result, a triangular lattice photonic crystal 70 with dielectric rods having a relative permittivity of 39 aligned in the resin having a permittivity of 2.8 is formed.

The size, composition, and characteristics of each component are as follows:
(a) Dielectric rods
   Composition: $(Zr,Sn)TiO_4$ based ceramic
   Size: 2.0 mmφ×9.5 mm
   Relative permittivity: $\epsilon r \approx 39$ at 12 GHz
(b) Magnetic rod
   Composition: NiCuZn-based ferrite
   $Fe_2O_3$: 47 mol %, NiO: 20.5%, ZnO: 22%, CuO: 10.5%
   Size: 2.4 mmφ×9.5 mm
   Relative permittivity: $\epsilon r \approx 11.8$ at 12 GHz
(c) Low-k dielectric member
   Composition: Photopolymer, epoxy resin
   Relative permittivity: $\epsilon r \approx 2.8$ at 12 GHz
(d) Lattice pattern
   Pattern: triangular
   Distance between dielectric rods (lattice spacing) a: 3.846 mm As in the first embodiment, a spinel ferrite (Mg—Mn ferrite, Mg—Mn—Al ferrite, Ni—Zn ferrite, Ni—Al ferrite, or Li—Fe ferrite), or a garnet ferrite (Y—Fe ferrite or Gd—Fe ferrite) may also be used instead of the ferrite described above.

Figure 10:
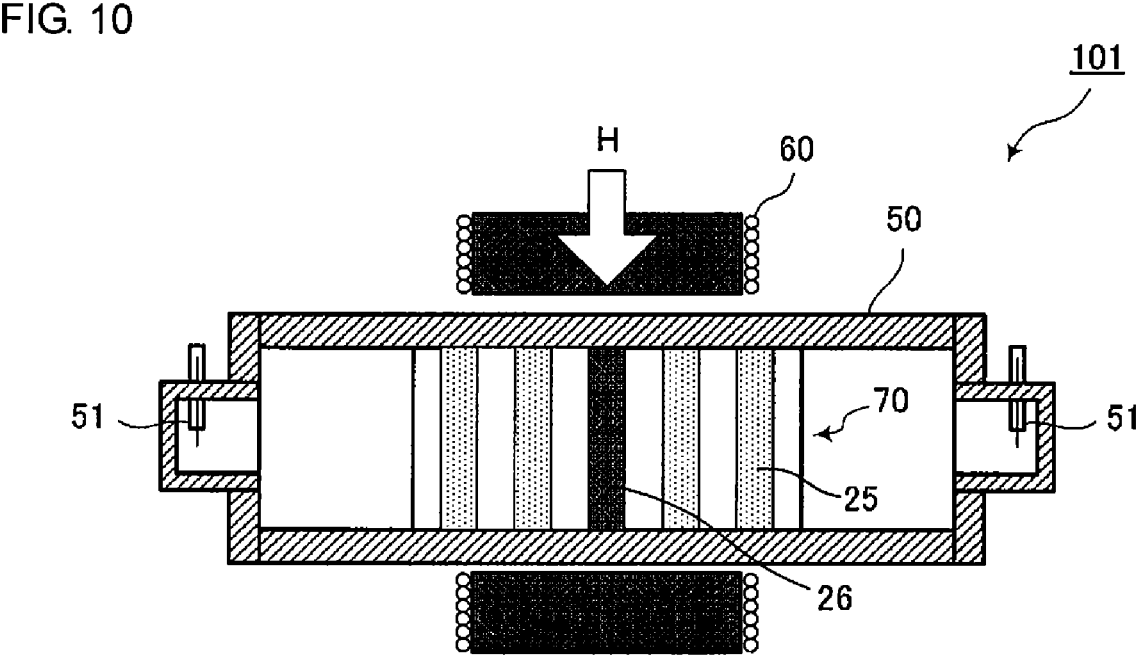
FIG. 10 is a cross-sectional view showing the overall structure of the band-pass filter 101 incorporating the photonic crystal 70 shown in FIGS. 9A to 9D.

FIG. 10 is a cross-sectional view showing the overall structure of a band-pass filter 101 incorporating the photonic crystal 70 shown in FIGS. 9A to 9D. Referring to FIG. 10, the band-pass filter 101 includes a rectangular waveguide 50 which propagates only the TE mode in which the amplitude direction of the electrical field of the propagating electromagnetic waves is the vertical direction. In other words, the amplitude direction of the electrical field is the vertical direction in FIG. 10, and the amplitude direction of the magnetic field is a direction perpendicular to the plane of paper. In order to control the center frequency of the pass band to 12.5 GHz, the rectangular waveguide 50 has a width set to 19.05 mm and a height set to 9.525 mm.

The rectangular waveguide 50 is composed of Al, Cu, or a resin plated with Cu, Ag, or the like.

The photonic crystal 70 shown in FIGS. 9A to 9D is inserted (loaded) in the rectangular waveguide 50. Each end of the rectangular waveguide 50 is provided with a probe 51 for signal input/output so that signals can be input and output through coaxial connectors.

An electromagnet 60 that applies a DC magnetic field H to the magnetic rod 26 of the photonic crystal 70 from outside the rectangular waveguide 50 is provided. The DC magnetic field H is applied in the amplitude direction of the electrical field of the electromagnetic waves propagating in the rectangular waveguide 50, i.e., in the direction penetrating the electrical field planes of the rectangular waveguide 50.

The mode propagating in the rectangular waveguide 50 is limited to the mode in which the amplitude direction of the electrical field is a particular direction (propagation mode). As a DC magnetic field is applied to the resonator unit, i.e., the magnetic rod, in a direction perpendicular to the propagation direction of the electromagnetic waves, the components of the permeability that affect the particular propagation mode in the resonator unit change, and thus the resonance frequency of the local mode, i.e., the frequency of the pass band, is shifted.

Figure 11A:
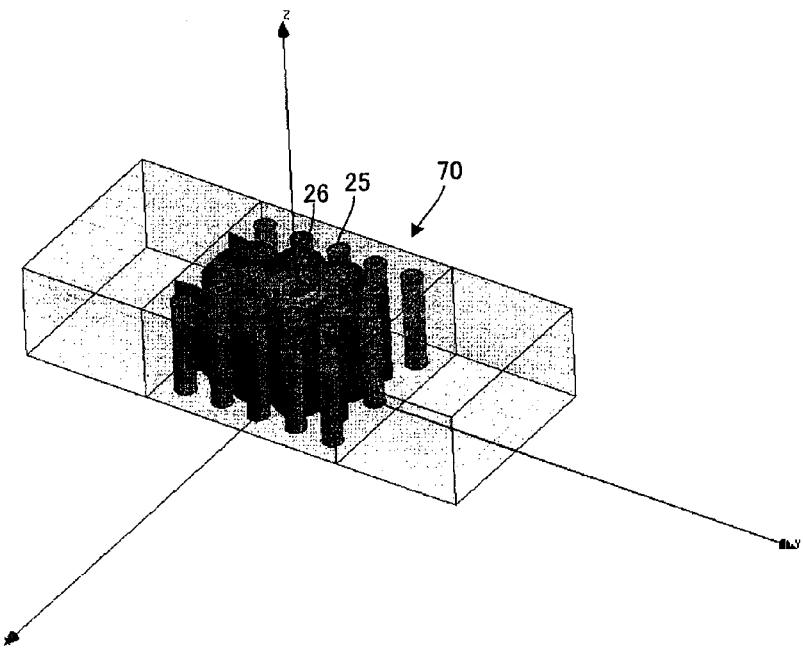
FIG. 11A is a graph showing the electrical field distribution of the band-pass filter incorporating the photonic crystal 70 including the dielectric rods 25 and the magnetic rod 26 and FIG. 11B is a graph showing the electrical field distribution of a band-pass filter incorporating a photonic crystal with no magnetic rod.
Figure 11B:
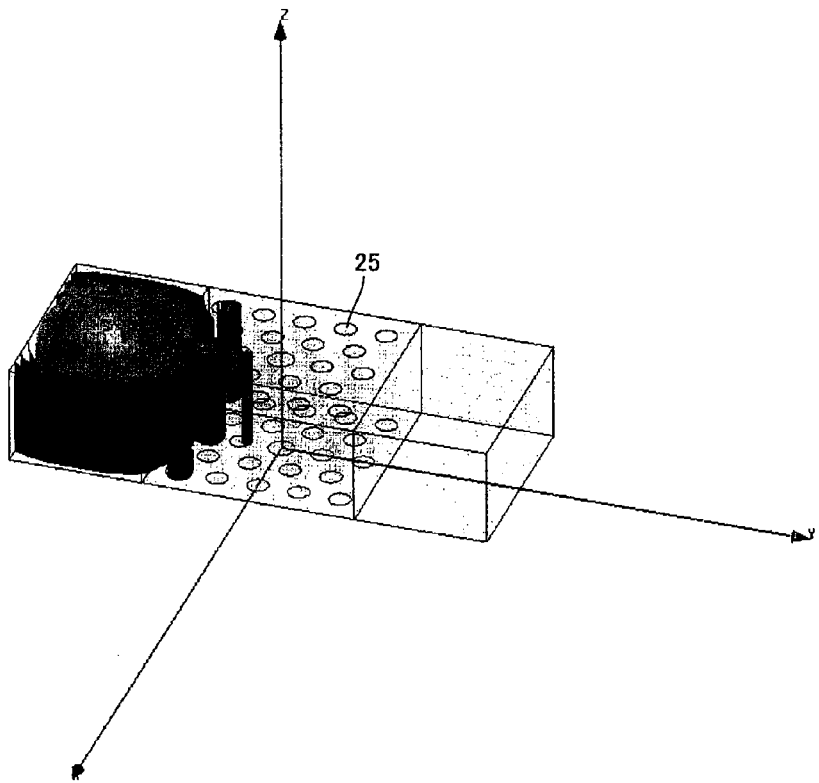

FIGS. 11A and 11B show electrical field distributions determined by finite element method (FEM) electromagnetic field analysis based on high frequency structure simulation (HFSS) of the band-pass filter incorporating the photonic crystal 70 including the dielectric rods 25 and the magnetic rod 26. The intensity of the electrical field is indicated as density. FIG. 11A is a distribution diagram of the electrical field intensity of the photonic crystal 70 shown in FIGS. 9A to 9D at a local frequency 13.1 GHz described below. FIG. 11B is a distribution diagram of the electrical field intensity at 12 GHz of a comparative photonic crystal in which the dielectric rod 25 is placed at the center instead of the magnetic rod 26.

FIG. 11B shows that in the case where a photonic crystal having no magnetic rod is used, electromagnetic waves are blocked by the photonic crystal at a frequency (12 GHz) of the photonic band gap. In contrast, in the case where the photonic crystal 70 shown in FIGS. 9A to 9D is used, the electromagnetic waves localize and the ferrite resonates in a single mode, as shown in FIG. 11A.

As described above, the passing loss of the pass band can be reduced by controlling the electrical length in the magnetic rod 26 to ½ wavelength of the particular frequency in the pass band since a strong local mode is thereby generated at the particular frequency.

The characteristics of the band-pass filter shown in FIG. 10 will now be described with reference to FIGS. 12A to 13.

A photonic crystal is designed through band calculation based on a plane wave expansion method. The band of the photonic crystal is dependent on the ratio of the permittivity of the high-k dielectric member (dielectric rod 25) to the permittivity of the low-k dielectric material (epoxy resin 40), i.e., the dielectric matrix and the ratio of the radius of the dielectric member to the crystal lattice spacing. The region in which the band gap is formed is thereby limited. The design is also affected by whether the propagation mode of the electromagnetic waves is TE or TM and by the alignment pattern of the dielectric rods. Here, a case in which the dielectric rods are arranged at triangular lattice points is discussed.

Figure 12A:
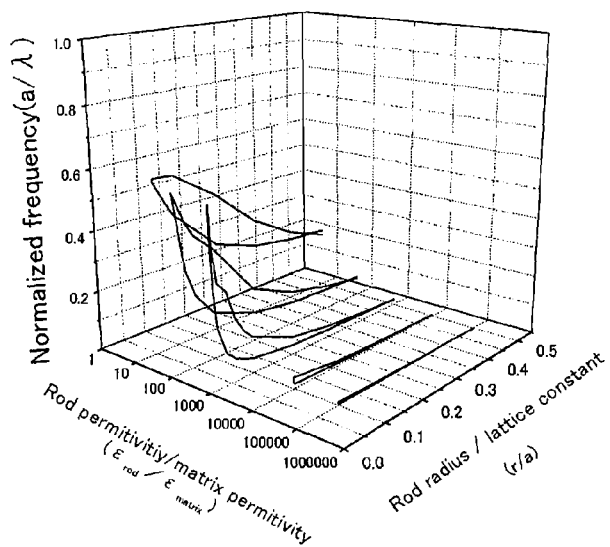
FIGS. 12A and 12B are band gap region diagrams of the photonic crystal 70 shown in FIGS. 9A to 9D.
Figure 12B:
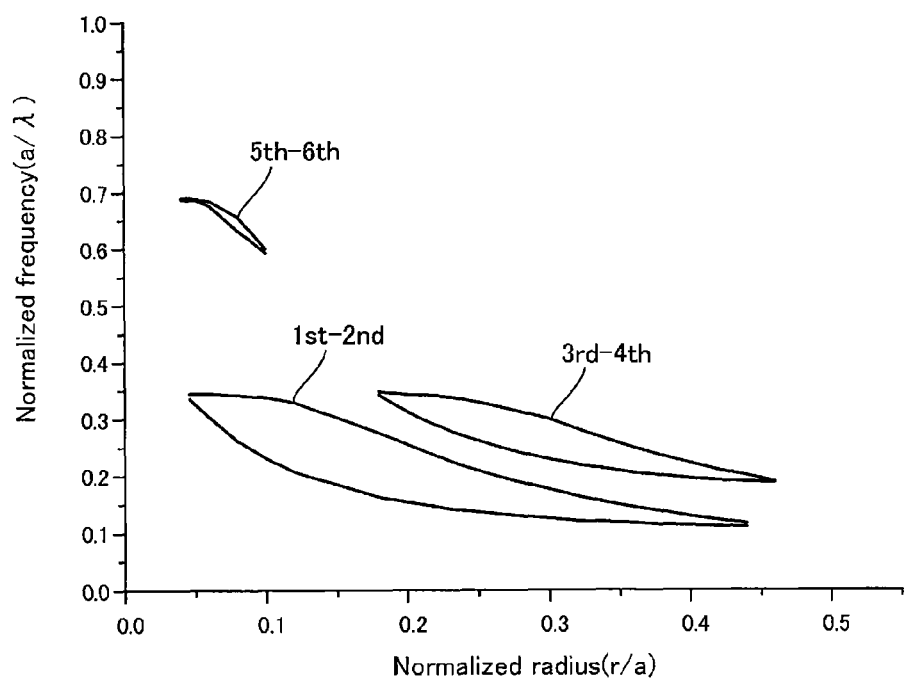

FIGS. 12A and 12B are band gap region diagrams of the photonic crystal 70 shown in FIGS. 9A to 9D. FIG. 12A is a graph showing the relationship between the ratio of the permittivity of the high-k dielectric member (dielectric rod 25) to the permittivity of the low-k dielectric member (epoxy resin 40), and the ratio of the radius of the dielectric rod and magnetic rod to the crystal lattice spacing. In this graph, the first band gap region of the TE mode is shown. The horizontal axes of the graph in FIG. 12A indicate the ratio of the permittivity of the high-k dielectric member (dielectric rod 25) to the permittivity of the low-k dielectric member (epoxy resin 40) and the ratio of the radius of the dielectric rod 25 to the crystal lattice spacing. The vertical axis indicates normalized frequency (ratio of the crystal lattice spacing to the wavelength $\lambda$).

When the permittivity of the dielectric rod is higher than that of the low-k dielectric member, the first band gap that appears between the first band and the second band of the TE mode is one shown in FIG. 12A.

FIG. 12B is a band diagram of the photonic crystal 70 shown in FIGS. 9A to 9D in which the relative permittivity of the dielectric rod 25 is 39 and the relative permittivity of the epoxy resin 40 is 2.8. In FIG. 12B, the horizontal axis indicates the ratio of the radius r of the dielectric rod 25 to the lattice spacing a and the vertical axis indicates the normalized frequency (the ratio of the lattice spacing a to the wavelength $\lambda$). In the diagram, [1st-2nd] indicates a first band gap between the first band and the second band, [3rd-4th] indicates a second band gap between the third band and the fourth band, [5th-6th] indicates a third band gap between the fifth band and the sixth band. The graph shows that, in this example, r/a of about 0.26 is appropriate since the first band gap [1st-2nd] and the second band gap [3rd-4th] open widely at such a ratio.

In order to adjust the band gap range from 10 to 15 GHz, the band gap needs to be generated at a normalized frequency a/$\lambda$ of 0.033 to 0.050 under a lattice spacing a of 1. It can be estimated that the first band gap between the first band and the second band and the second band gap between the third and fourth bands are generated by setting the radius of the dielectric rod 25 to 0.26 mm.

Since the normalized frequency of the first band gap ranges from 0.1333128 to 0.201631 and the lattice spacing a=1, the wavelength ranges from 1/0.1333128 μm=7.5012 μm to 1/0.201631 μm=4.9596 μm and the frequency ranges from 300000/7.5012 GHz=39994 GHz to 300000/4.9596 GHz=60489 GHz.

Since the normalized frequency of the second band gap ranges from 0.253748 to 0.324173, the wavelength ranges from 1/0.253748 μm=3.9409 μm to 1/0.324173 μm=3.0848 μm and the frequency ranges from 300000/3.9409 GHz=76125 GHz to 300000/3.0848 GHz=97251 GHz.

Suppose that the diameter φ of the dielectric rod 25 is 2.0 mm. The size of an actual model is 2000/(0.26×2)=3846 times greater than the size of the calculation model. In the actual model, the frequency of the first band and the frequency of the second band are, respectively, 39994/3846 GHz=10.39 GHz and 60489/3846 GHz=15.73 GHz, and the center frequency is (10.39+15.73)/2 GHz=13.06 GHz. The frequency of the third band and the frequency of the fourth band are, respectively, 76125/3846 GHz=19.79 GHz and 97251/3846 GHz=25.29 GHz, and the center frequency is (19.79+25.29)/2 GHz=22.546 GHz.

Thus, the first band gap is designed to range from about 10 GHz to about 15.0 GHz.

Next, the peak of the local mode spectrum attributable to defects is set at the center frequency of the photonic band gap, i.e., 13 GHz. This is done by finite-difference time-domain (FDTD) simulation involving varying the diameter of the magnetic rod. The results of the simulation showing how the local frequency changes by changing the diameter D of the magnetic rod having a permittivity of 11.8 are shown in FIG. 13.

In FIG. 13, P11, P12, P13, P14, and P15 respectively indicate the pass bands when D=1.54 mm, D=2.00 mm, D=2.30 mm, D=2.62 mm, and D=3.38 mm. It can be understood from these results that since the required local frequency is about 13 GHz, the diameter D of the ferrite should be about 2.4 mm.

Figure 14A:
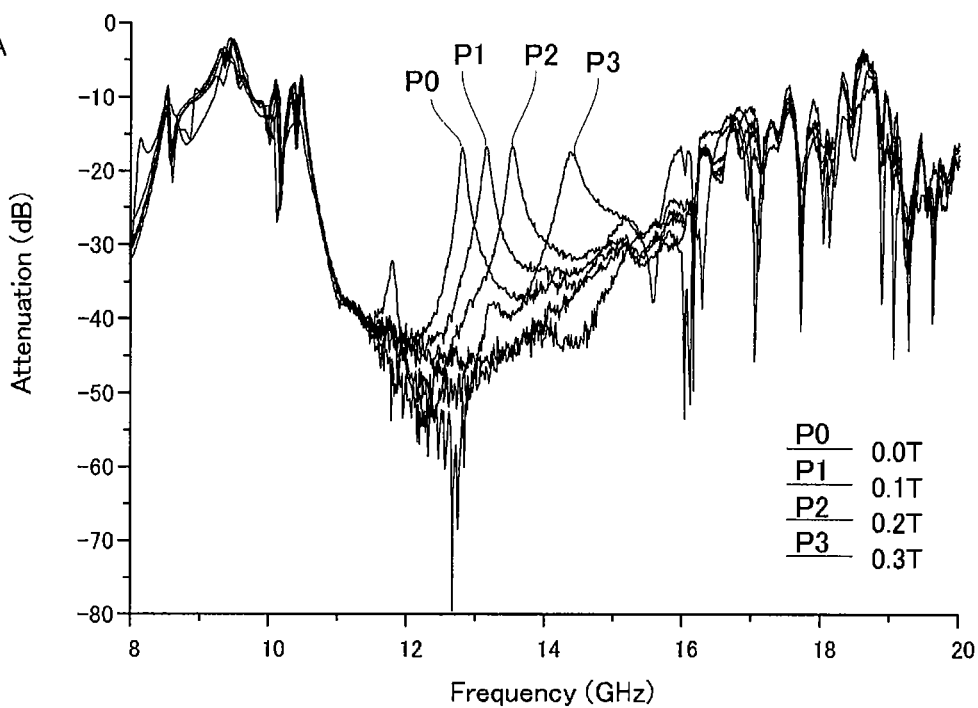
FIGS. 14A and 14B are graphs showing the frequency shift characteristics of the local mode relative to the magnetic field applied to the photonic crystal of the band-pass filter.
Figure 14B:
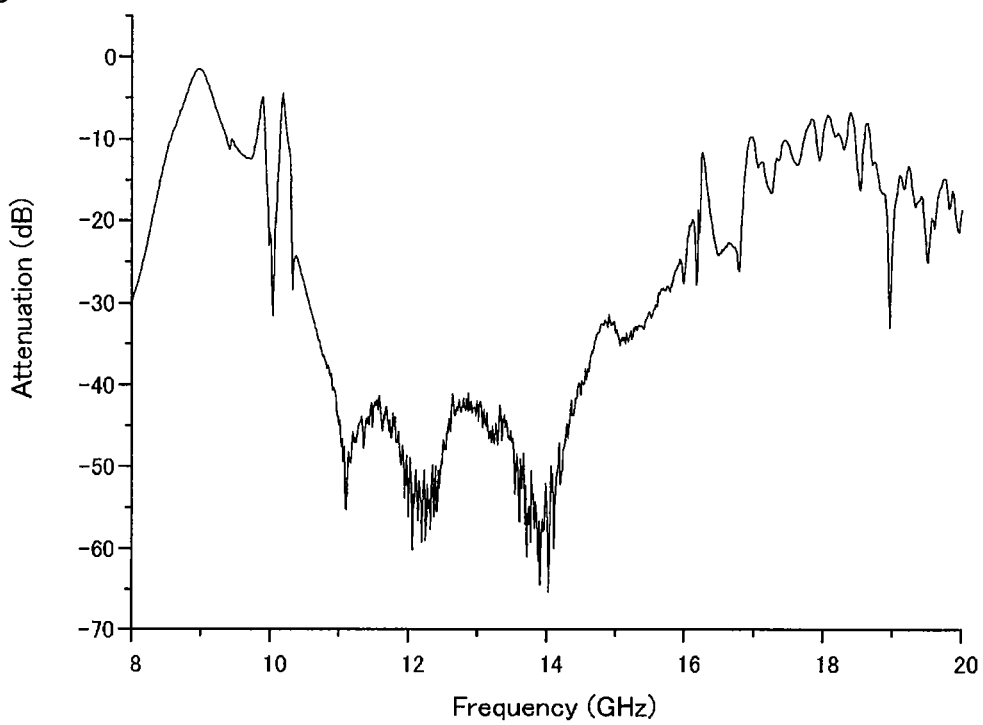

FIG. 14A shows the frequency shift characteristic of the local mode of the band-pass filter 101, shown in FIG. 10 incorporating the photonic crystal 70 designed as above, with respect to the applied magnetic field. FIG. 14B shows the characteristic of a comparative photonic crystal in which a dielectric rod 25 is disposed at the center instead of the magnetic rod 26.

In FIG. 14A, P0 to P3 all indicate S21 characteristics. The magnetic flux density of the electromagnet is as follows:
P0: 0.0 T
P1: 0.1 T
P2: 0.2 T
P3: 0.3 T The intensity of the magnetic field applied to the magnetic rod 26 is proportional to the magnetic flux density of the core of the electromagnet, and the relative permeability μr of the magnetic rod 26 decreases with an increase in applied magnetic field. Thus, the resonance frequency of the local mode increases, and this causes the pass band to shift upward.

The range of the magnetic field applied to the magnetic rod 26 is controlled as in the first embodiment. That is, the intensity of the DC magnetic field is controlled so that the relative permeability μeff is 1 or less.

Third Embodiment

FIGS. 15A to 15D show a structure of a photonic crystal 71 for use in a band-pass filter of a third embodiment.

Figure 15A:
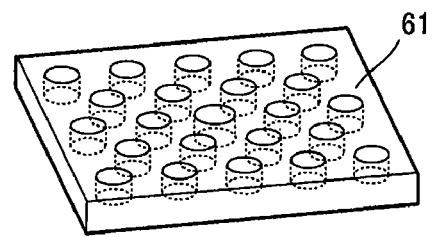
FIGS. 15A to 15D are diagrams showing the structure of a photonic crystal 71 used in a band-pass filter of a third embodiment.
Figure 15B:
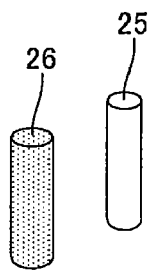

FIG. 15A is a perspective view of an upper epoxy resin plate 61, i.e., a low-k dielectric member, and FIG. 15B is a diagram showing the shapes of a dielectric rod 25, i.e., a high-k dielectric member, and a magnetic rod 26, i.e., a magnetic member.

Figure 15C:
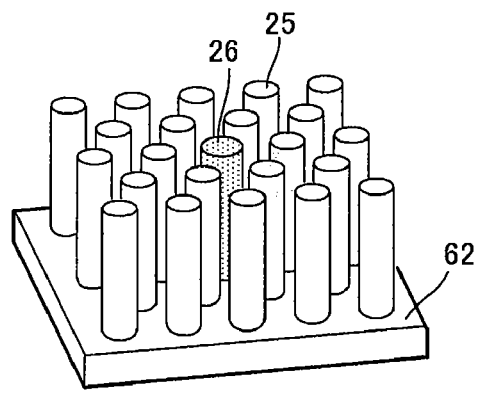

FIG. 15C is a diagram showing the state in which the dielectric rods 25 and the magnetic rod 26 are inserted in a lower epoxy resin plate 62, which is another low-k dielectric member. As shown in the drawing, the dielectric rods 25 are arranged in a particular two-dimensional pattern, and the magnetic rod 26 is disposed at the center of the pattern.

Figure 15D:
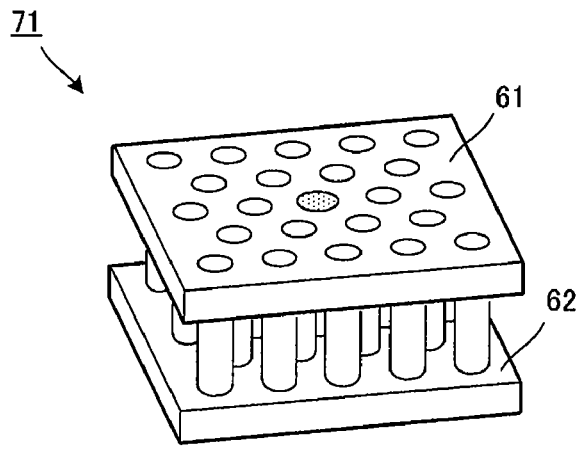

FIG. 15D shows a state in which the upper epoxy resin plate 61 is placed at the top of the dielectric rods 25 and the magnetic rod 26 shown in FIG. 15C.

The photonic crystal 71 in which only the top and bottom parts of the dielectric rods 25 and the magnetic rod 26 are held by the low-k dielectric members (epoxy resin members) is thus made. The photonic crystal 71 is formed by stereolithography as in the second embodiment.

Even when the main portions surrounding the dielectric rods 25 and the magnetic rod 26 are formed as spaces (air), the structure can function as a band-pass filter.

In the second and third embodiments, triangular lattice photonic crystals are described as examples. The crystal structure may be any other suitable structure. The input/output angle of the electromagnetic waves relative to the crystal plane is not limited to those shown in FIGS. 9A to 11B and may be any other appropriate angle or direction. The lattice pitches need not be regular.

Although the embodiments described above operate in a 12.5 GHz band, the present invention is applicable to frequency band of about 1 GHz to about 100 GHz. The main usage of this frequency band is communication. The frequency-variable band-pass filter can be used as a filter for multiband transmitters.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A band-pass filter comprising:
a photonic crystal having a local mode that generates a pass band in a stop band formed by Bragg reflection, the photonic crystal including:
a periodic structure including a low permittivity dielectric member and a plurality of high permittivity dielectric members periodically arranged in the low permittivity dielectric member so that said Bragg reflection occurs in the periodic structure, and
a magnetic member disposed in the periodic structure;
the local mode of electromagnetic waves propagating in the photonic crystal are limited by a transmission channel such that an amplitude direction of an electrical field is a first direction
a magnetic field-applying unit for applying to the photonic crystal a DC magnetic field in a direction perpendicular to the propagation direction of the electromagnetic waves,
wherein an electrical length inside the magnetic member is about ½ wavelength at a frequency within the pass band.

2. A method for making the photonic crystal of claim 1 for the band-pass filter, comprising the steps of:
stereolithography forming the low permittivity dielectric member with a photo-curable resin to include regions in which the high permittivity dielectric members are to be arranged comprising scanning a photo-curable resin with light; and
inserting the high permittivity dielectric members and the magnetic member in the regions.

3. The band-pass filter according to claim 1 wherein the direction of the DC magnetic field is substantially parallel to the amplitude direction of the electrical field.

4. The band-pass filter according to claim 1, wherein the magnetic field-applying unit is controllable to an intensity of the DC magnetic field to be equal to or lower than a magnetic field at which the magnetic member magnetically resonates and the magnetic member has an effective relative permeability in the range of about 1 or less.

5. The band-pass filter according to claim 1, wherein the DC magnetic field-applying unit is a variable magnetic field-applying unit.

6. The band-pass filter according to claim 1, wherein the transmission channel is a rectangular waveguide.

7. The band-pass filter according to claim 1, wherein the magnetic member comprises a ferrite.

8. The band-pass filter according to claim 1, wherein:
the low permittivity dielectric member comprises a plurality of low permittivity dielectric layers, the high permittivity dielectric members comprises a plurality of high permittivity dielectric layers, and the magnetic member comprises a magnetic plate,
the photonic crystal includes two reflectors between which the low permittivity dielectric layers and the high permittivity dielectric layers are alternately stacked, and the magnetic plate is disposed between the two reflectors, and
the photonic crystal is a Fabry-Perot resonator that includes a magnetic member resonance layer for generating the pass band in a stop band formed by the two reflectors.

9. The band-pass filter according to claim 8, wherein an optical length of each of the low permittivity dielectric layers and the high permittivity dielectric layers is about ¼ wavelength at a wavelength of the stop band.

10. The band-pass filter according to claim 9, wherein the low permittivity dielectric layers comprise resin and outermost layers of the photonic crystal are resin layers.

11. The band-pass filter according to claim 10, wherein the outermost layers of the photonic crystal are epoxy resin layers and have a thickness which is less than the low permittivity dielectric layers between the outermost layers.

12. The band-pass filter according to claim 8, wherein the direction of the DC magnetic field is substantially parallel to the amplitude direction of the electrical field.

13. The band-pass filter according to claim 8, wherein the magnetic field-applying unit is controllable to an intensity of the DC magnetic field to be equal to or lower than a magnetic field at which the magnetic member magnetically resonates and the magnetic member has an effective relative permeability in the range of about 1 or less.

14. The band-pass filter according to claim 1, wherein:
the high permittivity dielectric members are cylindrical dielectric rods;
the low permittivity dielectric member occupies space around the cylindrical dielectric rods;
the magnetic member is a cylindrical magnetic rod; and
the dielectric rods are arranged in a two-dimensional pattern inside the low permittivity dielectric member and a position in the pattern is occupied by the magnetic rod.

15. The band-pass filter according to claim 14, wherein the direction of the DC magnetic field is substantially parallel to the amplitude direction of the electrical field.

16. The band-pass filter according to claim 14, wherein the magnetic field-applying unit is controllable to an intensity of the DC magnetic field to be equal to or lower than a magnetic field at which the magnetic member magnetically resonates and the magnetic member has an effective relative permeability in the range of about 1 or less.

17. The band-pass filter according to claim 14, wherein the magnetic member comprises a ferrite, the low permittivity dielectric layers comprise resin and outermost layers of the photonic crystal are resin layers.

* * * * *